July 28, 1931. F. N. MOERK ET AL 1,816,603
CONTROL SYSTEM
Filed Aug. 13, 1928 5 Sheets-Sheet 1
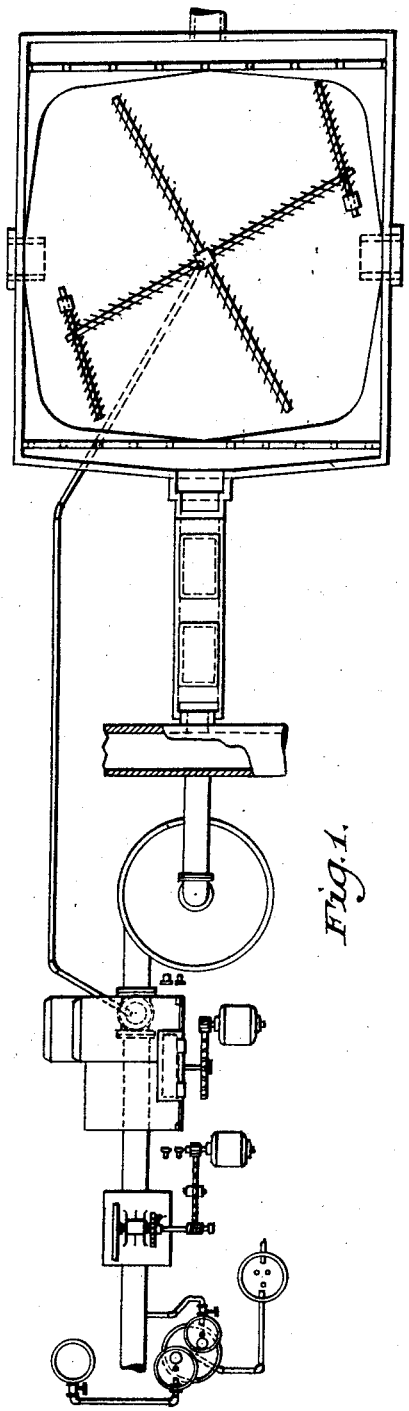
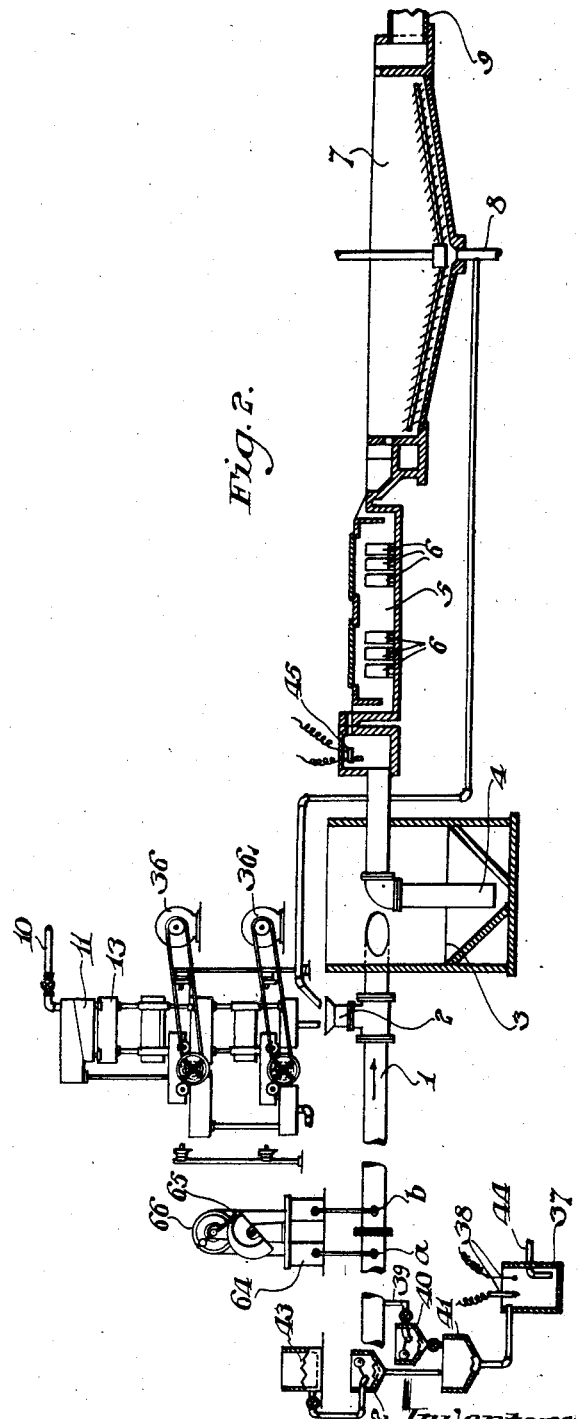

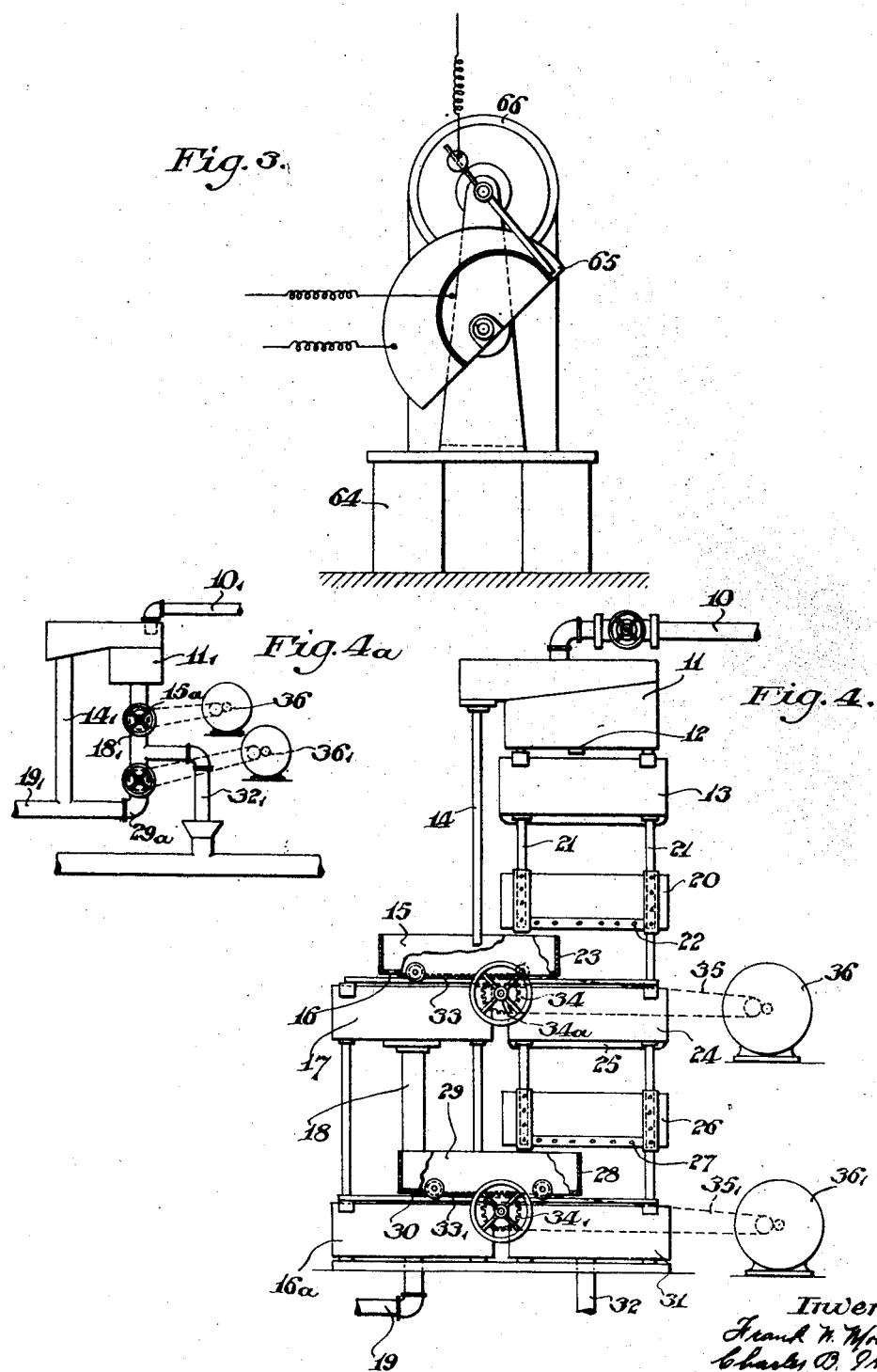

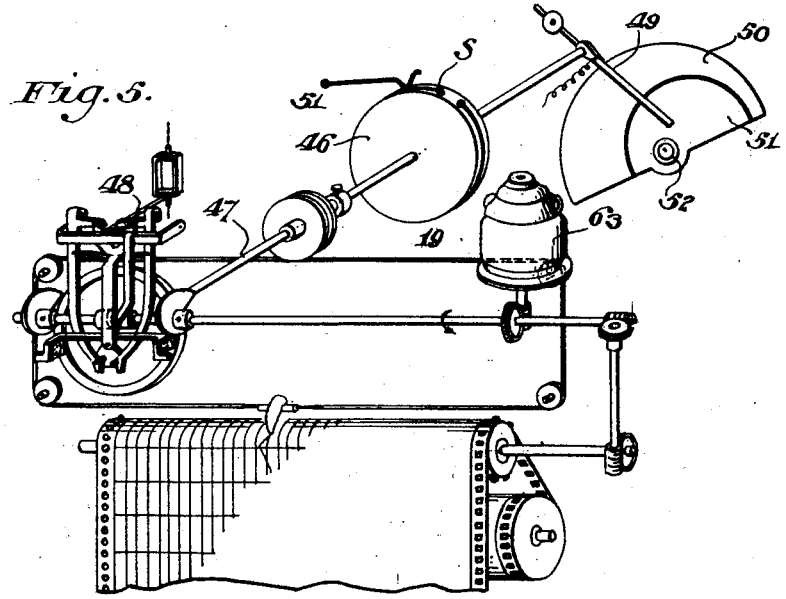
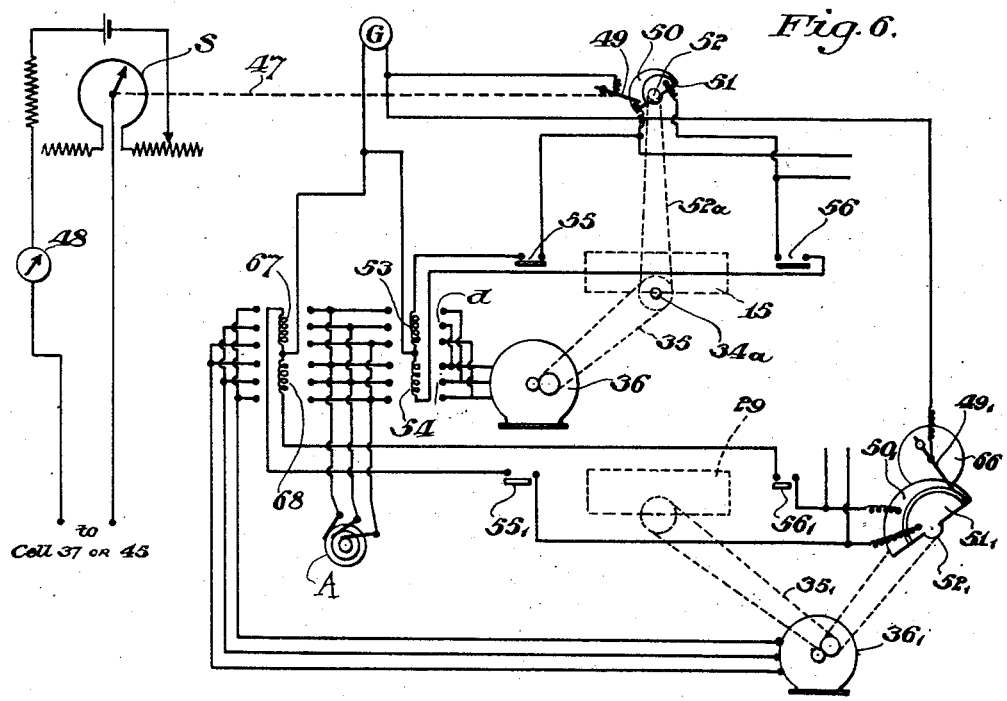

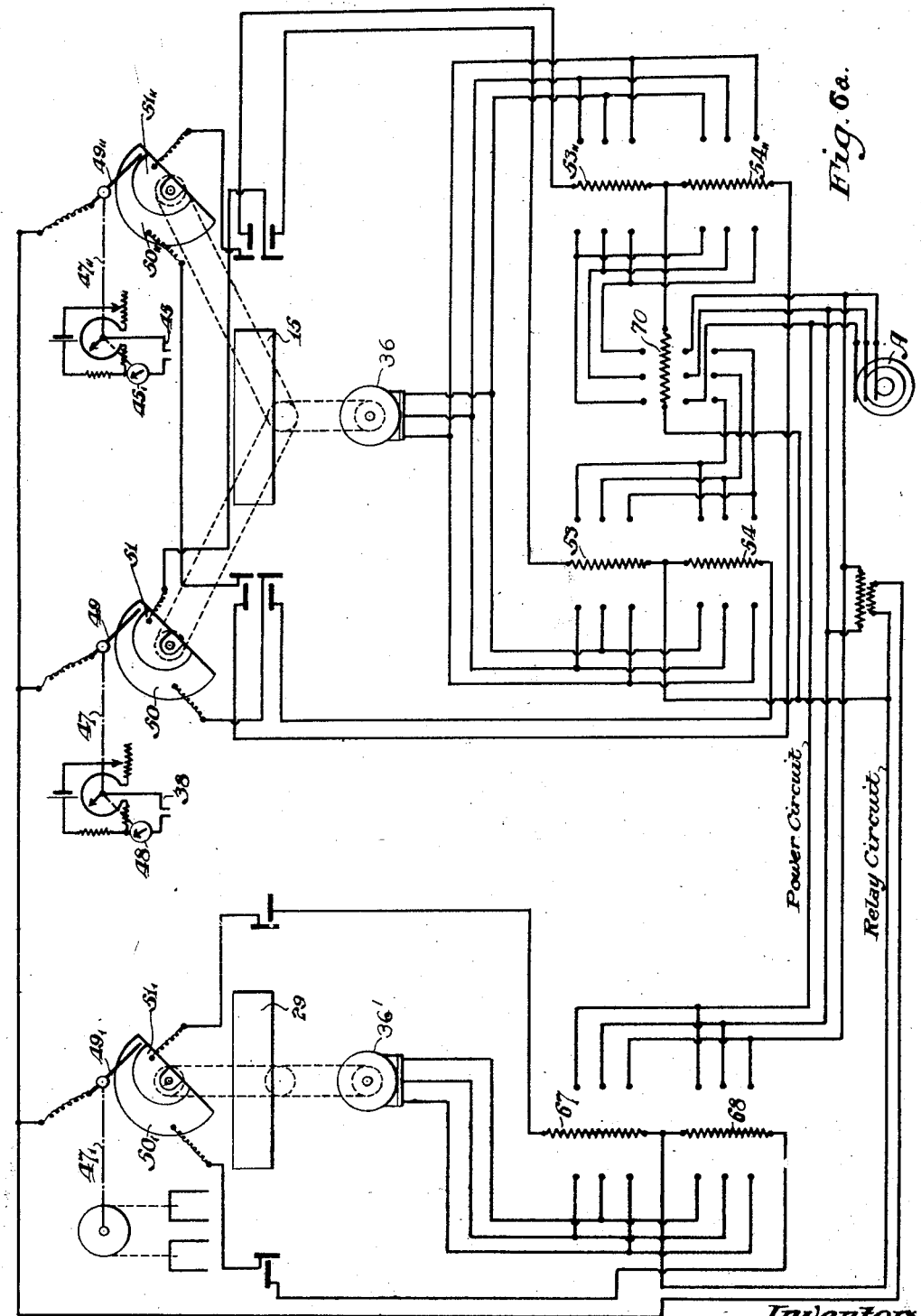

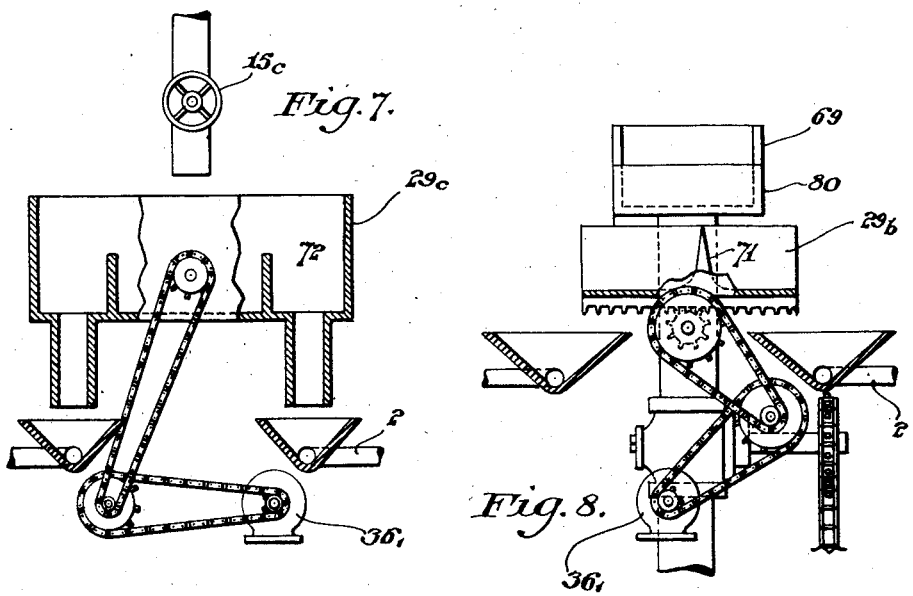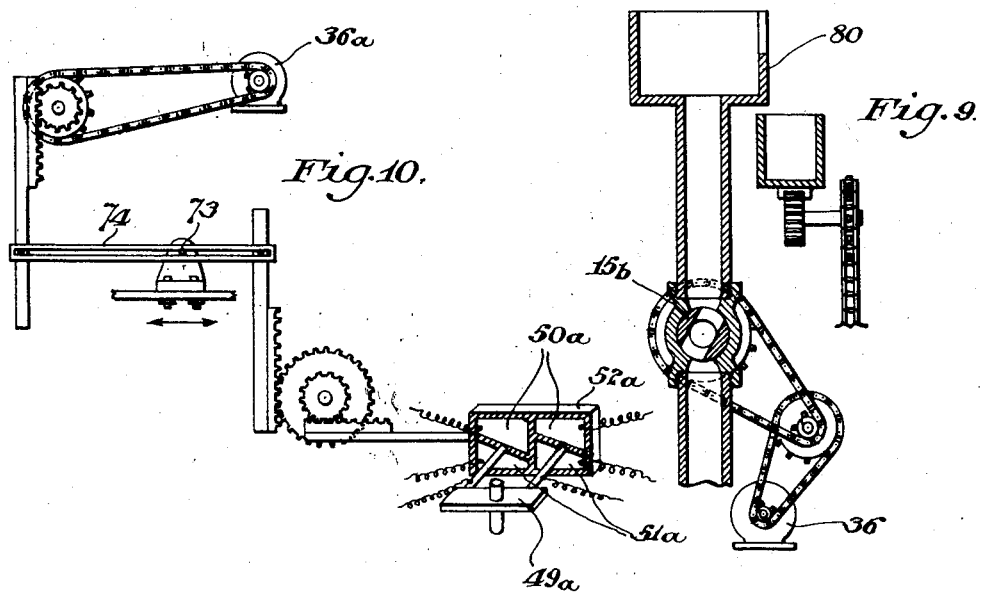

Patented July 28, 1931

1,816,603

UNITED STATES PATENT OFFICE

FRANK N. MOERK AND CHARLES B. IRMER, OF PHILADELPHIA, PENNSYLVANIA

CONTROL SYSTEM

Application filed August 13, 1928. Serial No. 299,439.

Our invention relates to a system of control in which effects are produced in response to changes of conditions, as electrical, physical, mechanical or chemical, to control the application of an agent or agents, physical, chemical, thermal, electrical or the like.

In accordance with our invention, the variable, effective magnitude or quantity of each of one or more agents, applied to a gas, liquid or solid, under treatment is maintained substantially proportional to the product of a plurality of, as two, varying factors representative, respectively, of the magnitudes of different conditions of the gas, liquid or solid to effect a desired state, despite variations in the magnitudes of the different conditions; more particularly, the magnitude of one factor determines the available magnitude or quantity of an agent, and the magnitude of another factor determines the ratio between the available magnitude or quantity of the agent and the effective or applied quantity thereof; more specifically, one factor determines the ultimate proportions per unit volume of the agent and material treated thereby, and another factor determines the total effective quantity or amount of agent applied in accordance to the number of unit volumes.

More particularly and preferably, in accordance with our invention, there is utilized an apparatus, a component of which is responsive to a condition, as, for example, conductance or ion concentration of a unit quantity of a liquid, to render available an agent in quantity determined by departure of the magnitude of the condition from a desired value, and sufficient or in excess of that required to effect the desired magnitude of the condition, and another component of which is responsive to another condition, as the number of units, determined for example by the rate of flow of a liquid, to divert the excess of the agent, if any.

More specifically, the feed of an agent comprising an element, or a plurality of elements in physical chemical combination, in gaseous, liquid or solid form, is controlled in accordance to the amount required per unit quantity of and to the rate of flow of a substance, gaseous, liquid or solid in character, for example, of a liquid stream containing matter in solution and suspension, to which the controlled amount of agent is applied to effect or maintain a desired condition of the stream.

Our invention further resides in features of construction, arrangement and combination of parts hereinafter described and claimed.

For an understanding of some of the forms our invention may take, reference is to be had to the accompanying drawings, in which:

Fig. 1 is a plan view diagrammatic in character, of a system embodying our invention.

Fig. 2 is an elevational view with parts in section of the system shown in Fig. 1.

Fig. 3 is a detail view in elevation and on an enlarged scale, of a control mechanism disclosed in Figs 1 and 2.

Fig. 4 is a detail view, in elevation and on an enlarged scale, of flow proportioning device disclosed in Figs. 1 and 2.

Fig. 4a is a diagrammatic view of a modified form of flow proportioning apparatus.

Fig. 5 is a perspective view of a recorder and controller mechanism.

Figs. 6 and 6a are diagrammatic views of circuit arrangements and systems embodying our invention.

Fig. 7 is an elevational view, in section, of a modified flow proportioning device.

Figs. 8 and 9 are front and side elevational views, respectively, in section, of another modification of a flow proportioning device.

Fig. 10 is a modification of the control mechanism of Fig. 3, in diagrammatic form.

Referring to Figs. 1, 2, 3 and 4, pipe 1, through which a fluid, as for example, a liquid, and particularly waste liquid containing matter in suspension and in solution, is flowing in the direction of the arrow, is provided with an influx feeder pipe 2 through which a treating medium or agent is introduced into the fluid stream. To effect diffusion of the agent in the stream and to insure substantial uniformity of admixture, substantially immediately following the application of the agent to the stream, the latter is discharged tangentially into a mixing tank or chamber 3 of the type described in United States Letters Patent to Moerk, granted August 19, 1924, at a velocity sufficiently high to induce a whirling or vortical movement and to prevent any solids or semi-solids in or produced within the liquid from collecting upon the side walls of the chamber. The velocity increases toward the lower end of the chamber because of its decrease in diameter, preferably attaining a maximum at or adjacent the discharge pipe or conduit 4 which delivers the treated fluid for further operations, for example, waste liquors, as sewage and the like, after application of suitable hydroxide thereto as calcium hydroxide, in proper quantity determined as hereinafter explained, is transmitted to electrolyzing apparatus 5, which may be of any type or character suitable to the process involved. It may comprise a plurality of banks or groups of electrodes 6, each comprising positive and negative electrodes, between which may be disposed agitating paddles, not shown. Electrolyzing apparatus of the foregoing character is disclosed in Letters Patent 1,139,778 to Landreth.

The calcium or other hydroxide solution reacts with contents of the sewage to produce a flocculent precipitate or coagulant, which however together with the solids and semi-solids contained in the sludge is prevented from sedimentation, in the chamber 3, as above described. The sewage so preliminarily treated is delivered to the electrolyzing apparatus 5 in such state that it contains after the aforesaid reaction, free, as distinguished from combined alkali. In its passage through the electrolyzing apparatus the free alkali (hydroxide) assists in the production of nascent oxygen by electrolysis, the free alkali being preferably present in quantity sufficient to prevent attack upon the positive electrodes of iron or the like, and to ensure free alkali in the effluent.

The solids and semi-solids, and also the bacteria and organic matter in solution, are oxidized and rendered harmless and nonputrescent, and the mixture is then delivered to a stream or to a sedimentation basin 7 where the solids, sludge and coagulant settle to the bottom, from which they are drawn off through the pipe or conduit 8, and the clarified effluent is discharged through outlet 9 to stream or other destination.

With the available control methods and apparatus, it is impossible by the application of an agent suitably to maintain a desired condition, as ion concentration, of the effluent within desirably narrow limits under the varying conditions encountered in practical operation. For an illustration of one form of our invention as applied to the system above described but not limited thereto, particular reference is made to Figs. 1 to 6 inclusive.

Referring particularly to Fig. 4, an agent suitable in character to effect the desired condition is supplied through pipe 10, in quantity in excess of that required under conditions of maximum demand to a constant head container or tank 11 having one or more orifices 12 in the bottom thereof through which there is constant flow of the agent to the weir box 13, although rate of flow through the supply pipe 10 may fluctuate. The amount of agent in excess of that necessary to maintain a constant head within the device 11 flows downwardly through pipe 14 and discharges into flow box 15 having an opening 16 therein through which it flows into the open topped tank 17 and thence through pipe 18 to the similar tank 16a from which it is discharged as through outlet conduit 19, preferably, into a circulatory system to be returned to pipe 10. From a wide flat weir at the lower rear edge of weir box 13, as viewed in Figs. 2 and 4 there is a constant flow of agent, as calcium hydroxide solution, to the rear end of weir box 20 disposed immediately below and held in position on the common supporting standards 21. The flow from the weir 22 of the lower weir box 20 is adapted to be divided by the cutting or dividing plate 23, a desired proportionate amount of the total determined as hereinafter described falling directly into weir box 24 and the remainder into the flow box 15 mingling with the discharge from overflow pipe 14 and eventually flowing therewith from the outlet pipe 19.

From a weir 25 extending substantially the width of weir box 24 and disposed at the rear, lower edge thereof, the divided amount of liquid falls into the rear of weir box 26 and travels to the front end from which it discharges through weir 27, that portion of the falling stream to the left, as viewed in Fig. 4, of the cutting or dividing plate 28 comprising an end wall of flow box 29, flowing into the flow box and through an orifice 30 in the bottom thereof into tank 16a, and that portion to the right of plate 28 dropping into an open tank 31 from which it flows through pipe 32 to feeder pipe 2 extending from pipe 1, as above described.

To the bottom of flow box 15 is affixed a rack bar 33 in meshing engagement with a gear 34 mounted on a shaft 34a, suitably driven as through chain 35, or equivalent, from a motor 36, there being interposed suitable reduction gearing to provide proper speed of change of position of the flow box upon energization of the motor. In a similar manner, the rack bar 33' in mesh with gear 34' is adapted to be actuated by motor 36' through chain 35'. To maintain proper relation between the movable flow boxes and the weir boxes directly associated therewith, the former are provided with flanged or grooved wheels which engage rails supported by the latter.

The position of the flow box 15 may be determined by the ion concentration of:

(a) The liquid before the application of the agent, (b) The liquid after the application of the agent, and (c) The liquid both before and after the application of the agent.

In case (a) for example, a continuous sample of the liquid flowing through pipe 1, Fig. 2, before the application of the agent is supplied to the ion concentration cell 37 having suitable electrodes therein, by an arrangement comprising the pipe 39 tapped into pipe 1 and connected to a chamber 40 in which a constant level is maintained as by a float controlled valve, as the liquid flows therefrom into a tank 41. The liquid unaltered or combined with definite proportion of a neutralizing agent supplied to mixing tank 41 from a constant level device 42 connected to reservoir 43, passes between electrodes 38 of the cell 37 to the bottom thereof and thereafter through pipe 44 to waste. When, for example, it is desired to determine the hydroxyl ion concentration, one of the electrodes may be tungsten, and the other a calomel half-cell.

The solution between electrodes 38 is comprised in or forms an arm of a self-balancing potentiometer, for example, generally of the character described in Brewer Patent 1,356,804, granted October 26, 1920, and in which, the slide wire S, Figs. 5 and 6, secured to a disc 46 mounted on a shaft 47, is rotated in a sense and to an extent proportional to the deflection of the galvanometer pointer 48, as more fully explained in the aforesaid patent.

To the shaft 47 is secured the movable contact arm 49 adapted to engage either of the contact plates 50 and 51 mounted upon a member or shaft 52 whose angular position or extent and sense of rotation is determined by the position and movement of the upper flow box 15. Movement of shaft or member 52 may be effected in any suitable manner, as for example, by a chain or belt 52a between a gear or pulley secured to the shaft 34a and to a like element secured to shaft 52.

Upon rotation of shaft 47 in clockwise direction, as viewed in Fig. 5, to a sufficient extent, contact arm 49 engages contact plate 50 to complete a circuit from a source of current G through the electromagnet or solenoid 53 to actuate and to retain in upper circuit closed position d, a switch controlling energization of motor 36 of any suitable type; in the example illustrated it is energized from a three phase alternator A, whereupon the flow box 15 is moved to a position, uniquely determined by the ion concentration, at which the contact plate 50 is out of engagement with the contact arm 49. The solenoid 53 is thereupon de-energized permitting the motor-controlling switch to return to open-circuit position.

Upon rotation of shaft 47 in a reverse or counter-clockwise direction to sufficient extent, contact arm 49 engages contact plate 51 to complete a circuit through solenoid 54 to actuate the motor control switch to its lower closed position to effect reversed rotation of motor 36, as for example in the illustration, by reversal of a phase, and consequently retrograde movement of flow box 15 and member 52. The contact plate 51 is thereby moved out of contact with contact arm 49 breaking the circuit of coil 54 to de-energize motor 36.

It follows therefore that the quantity of the agent supplied by flow box to the weir box 24 is at all times proportional to the vary or variable ion concentration of the stream, which is a measure of its agent demand per unit quantity.

In the event that the flow box 15 is moved beyond a predetermined limit in either direction, the limit switches 55 and 56 connected in series with the solenoids 53 and 54 respectively are adapted to be engaged by ends of the box to break the circuit of the energized solenoid whereupon the motor control switch returns to a neutral position to which it may be biased as by spring structure not shown.

The control system thus far described has the disadvantage that when the rate of flow of the liquid through pipe 1 varies, particularly to relatively great extents, the control is ineffective to maintain the ion concentration or other condition within suitably narrow limits. To avoid over-shooting and to maintain the controlled concentration substantially constant regardless of changes in the rate of flow of the stream, or the amount of liquid treated in a unit time, the flow box 15 and the associated supply is designed to furnish a quantity of agent capable of attaining a desired condition for the lowest or highest concentration of the stream, depending upon the agent and the conditions under which it is employed, and its highest rate of flow. For any given concentration, the quantity of agent flowing from box 15 is sufficient to properly treat the stream flowing at its highest velocity. The proportionate amount applied to the stream of the total amount from flow box 15 is determined by causing the lower flow box 29 to assume different positions related to the rate of flow of the stream.

Contact arm 49' adapted to engage either of contact plates 50' and 51' is moved to positions uniquely determined by various rates of flow by connecting it to the movable structure of a suitable flow measuring device. For example, between the points $a$ and $b$ of pipe 1, Fig. 2, is disposed a plate having a small opening and the difference of pressure on opposite sides of the plate, a function of the rate of flow, is impressed upon a float type flow meter 64. The movement of the floats are communicated by a cord 65, or equivalent, passing over pully 66 to contact 49'.

Solenoid 67 or 68 is energized depending on whether contact plate 50' or 51' is engaged by contact arm 49' effecting energization of motor 36' in a proper direction. The flow box 29 is moved thereby as above described simultaneously with member 52' carrying contact plates 50' and 51'. Upon the attainment by the flow box of a predetermined position at which proper division is made of the effluent of weir box 26 which receives the discharge from flow box 15 through weir box 24, the member 52' is in a position in which the contact 49' is out of electrical engagement with plates 50' or 51'. The circuit of motor 36' is broken in a manner similar to that above described in connection with motor 36 to prevent further movement of the box. As the rate of flow changes, the flow box assumes new positions definitely related to the new magnitudes.

Summarizing for case $(a)$, flow box 15 under its control divides the total flow of agent to supply a sufficiency thereof to the stream in accordance with its demand per unit quantity, and the flow box 29 under its control divides the flow of agent from flow box 15 in accordance with the number of units being treated in a unit of time so that despite independently variable conditions, the amount of agent applied is that required to attain a final desired result.

In case $(b)$ for example, the position of the flow box 15 is controlled by the ion concentration cell 45 placed in the path of the flow of the liquid between the diffuser 3 and the electrolyzer 5 as shown in Fig. 2. In this case the electrodes of cell 45 are connected in the potentiometer circuit in place of the electrodes of cell 37 as indicated in Fig. 6, and the position of the flow box 15 is regulated in exactly the same manner as described for case $(a)$. The position of the flow box 29 is regulated in the same manner as described under case $(a)$.

Summarizing for case $(b)$, flow box 15 divides the total flow of the agent to supply a sufficiency to the stream in accordance with the demand per unit quantity, said demand being indicated by the sufficiency or insufficiency of the agent in the treated liquid as determined by the ion concentration cell 45, and the flow box 29 under its control divides the flow of agent from flow box 15 in accordance with the number of units being treated in a unit time so that despite independently variable conditions, the amount of agent applied is that required to attain a final desired result.

In case $(c)$ for example, two self-balancing potentiometer controllers are employed, as shown in Fig. 6a, that electrically connected with the up-stream ion concentration cell being known as the up-stream control unit, and that in electrical connection with the down-stream ion concentration cell being known as the down-stream control unit.

The up-stream control unit controls the position of flow box 15 to divide the total flow of the agent to supply a sufficiency to the stream in accordance with the demand per unit quantity, as in case $(a)$.

The down-stream control unit operates as in case $(b)$ and makes a further or finer adjustment of the position of flow box 15 depending upon the degree of sufficiency or insufficiency of the quantity of agent added per unit quantity to the stream by the up-stream control unit.

As both of these control units energize the circuit of motor 36, Figs. 2, 4, 6 and 6a, which actuates or positions the flow box 15, it is desirable that one control unit be given preference over the other. In the wiring diagram of the electrical circuit, Fig. 6a, preference is given to the down-stream control unit through solenoid switch 70 in series with the contact plates 50'' and 51'' of the down-stream control unit. It follows that when contact arm 49'' is in electrical contact with either contact plate and opening the up-stream control unit circuit which normally remains closed. By this arrangement the proportioning of the agent addition is determined by the up-stream control unit which operates until either a sufficiency or deficiency of agent is recorded by the down-stream control unit which then opens the up-stream control circuit and corrects the agent addition in accordance with the demand per unit quantity as determined in the treated stream by the down-stream cell, after which the up-stream control circuit is closed and the down-stream circuit opened by the de-energization, for example, of the solenoid switch 70.

The proportioning of the agent in accordance with the number of units or the rate of flow of the stream is accomplished in the same manner as in cases $(a)$ and $(b)$.

Summarizing for case $(c)$, flow box 15 under its control divides the total flow of agent to supply a sufficiency thereof to the stream in accordance with its demand per unit quantity as determined by the up-stream control unit; the position of flow box 15 being checked and adjusted according to the accuracy of the agent addition as determined by the down-stream control unit. Flow box 29 under its control divides the flow of agent from flow box 15 in accordance with the number of units being treated in a unit time so that despite independently variable conditions, the amount of agent applied is that required to attain a final desired result.

The shape of the contact plates for determining the direction and extent of movement of the several flow boxes is determined from the characteristic of the measuring instrument with which it is associated.

Although the flow boxes are preferably automatically positioned as above described, it will be understood that in so far as certain aspects of our invention are concerned they may co-operate with a sliding scale and their position manually adjusted in accordance with observed readings, as of concentration and rate of flow.

While division of flow is preferably effected by flow boxes particularly when the agent applied is a comminuted solid or a solution containing matter in suspension, as a flocculent, specifically milk of lime, in some installations, it may be possible, desirable or necessary to use valves as in Fig. 4a. The upper valve 15a controls the available quantity of agent in accordance with one condition for example, ion concentration and the lower valve 29a divides the flow from valve 15a in accordance with another condition, so that the quantity of agent flowing from pipe 32' to the point of its application is of proper magnitude, despite variations of the conditions.

A further modification is shown in Figs. 8 and 9, in which the valve 15b controls the supply of agent to the box 69 so that the discharge over the weir 80 is proportional to the reagent requirement of the stream per unit quantity thereof and the discharge is further divided by the wall 71 of reciprocable flow box 29b in accordance with the rate of flow of the stream. The motors 36 and 36' may effect movement of valve 15b and box 29b through suitable reduction gearing in response to a control system as above described.

Another moification of the flow proportioning device is shown in Fig. 7 in which valve 15c controls the supply of agent to suitable excess, as in previously described arrangements, to a tilting weir box 29c, whose angular position as determined by the rate of flow in a manner similar to that described controls the proportional amount of agent which flows over weir 72 to the influx pipe 2.

It will be understood that more than one reagent may be applied and in accordance with the magnitude of different conditions, for example, alum may be applied to water in accordance with its turbidity and in turn precipitated or flocculated by the normal or adjusted alkalinity of the water following the application of the alum. Two flow box units as above described may be disposed, suitably adjacent if desired, the feed of alum from one upper flow box determined by the turbidity of the water, as ascertained for example by a photoelectric cell, and the feed of either acid or alkali as may be required from the upper flow box of the second unit determined by the ion concentration of the water after the addition of the alum. The lower flow boxes of both units may be operated from a single source, as a flow meter.

In Fig. 10, there is disclosed a modified contact mechanism for controlling the extent and direction of rotation of motors 36 and/or 36'. The contact 49a is moved in response to the changes of condition, as of rate of flow, by suitably connecting it to the movable structure of a flow meter and depending upon its position is adapted to engage and bridge the circuit between contacts 50a, or 51a to complete the circuit of a motor 36a, which may control the position of any of the flow boxes described. As the flow box is moved toward a position to effect a desired division of flow, the motor 36a through rack and link mechanism shown moves the member 52a carrying contacts 50a and 51a in a path at right angles to the path of movement of contact 49a until when the flow box is in proper position the contact 49a is in engagement with the insulating segment between the contacts. The relation between the extent of their movement and that of the flow box may be adjusted to suit various conditions and installations by changing the position of pivot 73 along link 74.

For brevity in the appended claims, the term "stream" in the appended claims includes solutions, comminuted solids capable of flow, or of solids transported by belts or the like and the term "fluid" is defined as any material having particles which readily move and change their relative positions.

What we claim is:

1. The method of applying an agent to a liquid stream to effect a desired condition thereof which comprises producing flow of the agent in excess, producing an effect proportional to the ion concentration of a unit quantity of the stream, dividing said flow proportionally to the magnitude of said effect, producing an effect proportional to the rate of flow of the stream, and effecting further division of said divided flow before application of said stream proportionally to the magnitude of said second effect.

2. The method of effecting a desired state of material to be or being treated by an agent and of varying quantity and agent demand per unit quantity, which comprises producing flow of the agent to excess, producing an effect proportional to said agent demand per unit quantity, varying the available portion of said flow in accordance with the magnitude of said effect, producing an effect proportional to the same quantity of material to be treated per unit of time, and dividing the flow of available agent in accordance with the magnitude of said second effect.

3. The method of applying an agent to a stream to effect a desired condition thereof which comprises producing flow of the agent to excess, producing an effect proportional to the up-stream agent demand per unit quantity thereof, dividing said flow in accordance with the magnitude of said effect, producing an effect proportional to the rate of flow of said stream, further dividing said flow in accordance with the magnitude of said effect, and applying the twice divided flow of agent to said stream.

4. The method of applying an agent to a stream to effect a desired condition thereof, which comprises producing flow of the agent in excess, dividing the flow successively in accordance with the rate of flow and agent demand per unit quantity of the stream, and applying the fraction of the flow of agent resulting from the successive divisions to the stream.

5. A control system for applying an agent to a stream comprising means for producing a flow of the agent in excess of the maximum requirements, means responsive to rate of flow of said stream, means responsive to the agent demand per unit quantity of said stream, structure controlled by one of said responsive means for diverting part of the flow of the agent, structure controlled by the other of said devices for dividing the diverted agent flow, and means for applying the flow of agent resulting from the successive divisions to the stream.

6. A control system for applying an agent to a stream comprising means for producing flow of the agent in excess of the maximum requirements, means responsive to the rate of flow of said stream, means responsive to the agent demand per unit quantity of said stream, a plurality of cascaded flow-boxes including stationary flow boxes and interposed movable flow-boxes, mechanism for controlling the position of one of said movable flow-boxes by one of said responsive means to divide the flow of agent into an available fraction and an unavailable fraction, mechanism for controlling the position of another of said movable flow boxes to divide the available fraction of flowing agent, and means for applying to said stream the flow of agent resulting from the successive divisions effected by the movable flow-boxes.

FRANK N. MOERK.
CHARLES B. IRMER.